PICTURE REPRODUCING SYSTEM HAVING VERTICAL SYNCHRONIZING SIGNAL GENERATION INDEPENDENT OF HORIZONTAL SCANNING FREQUENCY

Filed Dec. 12, 1963 3 Sheets-Sheet 1

INVENTORS
PETER C. GOLDMARK
JOHN M. HOLLYWOOD
BY
Brumbaugh, Free, Graves & Donohue
ATTORNEYS INVENTORS
PETER C. GOLDMARK
JOHN M. HOLLYWOOD
BY
Brumbaugh, Free, Graves & Donohue
ATTORNEYS

INVENTORS
PETER C. GOLDMARK
JOHN M. HOLLYWOOD

Brumbaugh, Free, Graves & Donohue
ATTORNEYS

United States Patent Office 3,333,058

Patented July 25, 1967

3,333,058

PICTURE REPRODUCING SYSTEM HAVING VERTICAL SYNCHRONIZING SIGNAL GENERATION INDEPENDENT OF HORIZONTAL SCANNING FREQUENCY

Peter C. Goldmark, Stamford, and John M. Hollywood, Greenwich, Conn., assignors to Columbia Broadcasting System, Inc., New York, N.Y., a corporation of New York Filed Dec. 12, 1963, Ser. No. 330,193
12 Claims. (Cl. 178—7.2)

This invention relates to apparatus for reproducing information recorded on a record medium. More particularly, it relates to apparatus for generating electrical signals representative of video and sound information recorded on photographic film.

This is a continuation-in-part of our copending application Ser. No. 187,035 filed Apr. 12, 1962, for "Motion Picture Film and Reproducing Apparatus Therefor," now U.S. Patent 3,290,437.

There is considerable interest nowadays in the use of motion picture films for educational purposes and as entertainment in educational institutions, hospitals and the like. However, both the conventional motion picture film and the equipment used heretofore for its projection by their very natures have imposed severe limitations upon the effectiveness of the motion picture medium for these applications. Thus, film made according to existing standards is bulky and therefore presents problems in distribution and handling. Moreover, each showing requires a relatively darkened room, an operator, a relatively expensive projection machine, a motion picture film, and a screen in unobstructed spaced apart relation to the projector.

As a result, considerations of economy limit the showing of a film to a large group at a single location and preclude the viewing of the film by a number of people all at different locations, such as, for example, patients in various rooms and wards of a hospital or pupils in different classrooms.

The present invention overcomes the above noted deficiencies of the prior art in part by utilizing an extremely small and thin film record which has recorded thereon picture information in a series of frames of pictures and sound information in an accompanying sound track. The film record may be approximately 1/10 the size of a typical 35 mm. film record, for example, and thus a complete motion picture or television program may be recorded on a single reel of relatively small size which lends itself to easy distribution and handling.

In addition a reproducing system is provided which is not elaborate, is fabricated using relatively small components, and is adapted to produce an electrical signal which may be applied directly to the antenna terminal of a standard television receiver which is used as the ultimate reproducing means. Thus, the system is suitable for reproducing the film record simply, and is capable of "playing" to an audience composed of persons at different locations.

The reproducing system may utilize a film drive mechanism, such as a capstan arrangement utilizing no sprockets and requiring no corresponding sprocket holes in the film, which in itself reduces the minimum size of the film record and facilitates film storage by, for example, making it possible to store more film in a cartridge of given size. This arrangement is not necessary if the film is not so small as to preclude the use of sprocket holes to be engaged by the typical film drive mechanism presently employed in film reproducing systems.

The film record is driven so that each picture frame thereon is conveyed through a scanning area. In a first representative embodiment of the invention, a moving spot of light which continuously sweeps in a typical scanning raster to form successive fields of displaced line scans is directed to the scanning area so that each frame is scanned as it passes through the area. If the number of films frames driven through the scanning area per unit time is one-half the number of field scansions of the light spot per unit time, an optical "film chasing" system is employed so that each film frame is scanned twice to provide typically two interlaced scansions of the frame. If, on the other hand, the number of film frames driven through the scanning area per unit time is equal to the number of field scansions of the light spot per unit time, then a chasing system is not needed, and each frame is scanned only once by a single field scansion.

In another representative embodiment of the invention, a line scan tube is employed which generates a moving spot of light which sweeps in successive super-imposed lines across the scanning area. As each frame moves through the scanning area, the entire frame is scanned. If desired, the line sweep may be slowly shifted to avoid screen burn in the cathode ray tube generating the light spot.

A photo multiplier detects the light transmitted through the scanned frame of the film and converts this into an electrical signal which is amplified and modified to produce a video signal. During the scanning of each picture frame, an adjacent portion of the sound track is illuminated by a fixed light source to activate a photocell whose signal is amplified to produce a sound signal. The sound and video signals may be conveyed separately to independent sound and video reproducing units, or they may be mixed to provide a single signal which may be applied to the antenna terminals of one or more conventional television receivers for reproduction therein.

An important feature of the invention lies in the independent generation of blanking and synchronization signals. In the embodiment of the invention described above utilizing field scansions of the moving spot of light, the blanking synchronization signals are added to the video signal to provide synchronization and blanking during reproduction in television receivers. These signals are also applied to the scanning signal generating circuits that control the scanning action of the film scanning light spot. In particular, a unique control circuit is employed which synchronizes the field scanning action to the passage of the frames on the film record through the scanning area.

To elaborate, a portion of the film record near each frame contains a synchronization marking which results in the generation by the photo multiplier of a signal of predetermined frequency when the marking is scanned by the light spot. A tuned detection circuit detects the signal, which is indicative of the passage of this portion of the film through the scanning area, and in response thereto gates a varying reference signal that is generated at the beginning of each vertical or field sweep of the light spot. The value of the varying reference signal at the time of gating is indicative of the time during a vertical sweep when the synchronization marking portion of the film record is scanned. This gated varying reference signal thus constitutes a correction signal which is used to vary the frequency of the vertical or field sweeps of the spot of light so that the frequency of scanning is equal to the frequency at which the picture frames pass through the scanning area. Additionally, the correction signal is used to vary the location of the scanning pattern so that it encompasses only a single picture frame on the film.

Time constants are introduced into the circuits controlling the frequency and location of the field sweeps of the light spot so that, in response to a given correction signal generated as described above, a shift in the location of the scanning pattern occurs and also a shift in the frequency of the field sweeps occurs. In this fashion, an immediate correction is made to change the area scanned and an overall change in the frequency of field sweeps is effected to make this frequency equal to that at which the film frames move through the scanning area.

In the embodiment of the invention described above employing successive superimposed line sweeps across the scanning area, the synchronization and blanking signals are added to the video signal to provide synchronization and blanking during reproduction. The line sweep frequency is fixed so that it conforms to television line sweep standards, i.e., 15,750 line sweeps per second. When the portion of the film record near each frame containing the synchronization marking passes through the scanning area and is scanned by the light spot to generate a signal of predetermined frequency, a tuned detection circuit generates blanking and synchronization signals that are added to the video signal to trigger vertical or field sweep blanking and synchronization in the television receivers reproducing the recorded information. The line sweep blanking and synchronization signals are derived directly from the scanning generator that provides signals for the line sweeps of the scanning light spot. These signals are also added to the video signal to trigger horizontal blanking and synchronization in the reproducing television receivers. In this fashion, the movement of the film record and the scanning action are made independent, avoiding complicated synchronization equipment. Synchronization during reproduction is achieved by the development of the synchronization and blanking signals as the film moves through the scanning area.

Other features of the invention include circuits for providing relatively constant light intensity of the scanning light beam and relatively uniform peak signal output from the photo multiplier.

A detailed description follows of the invention described in general terms above, which is to be read in conjunction with the appended drawings, in which:

FIGS. 1A and 1B taken together are a block diagram of a film reproducing system in accordance with the invention;

Figure 1A:
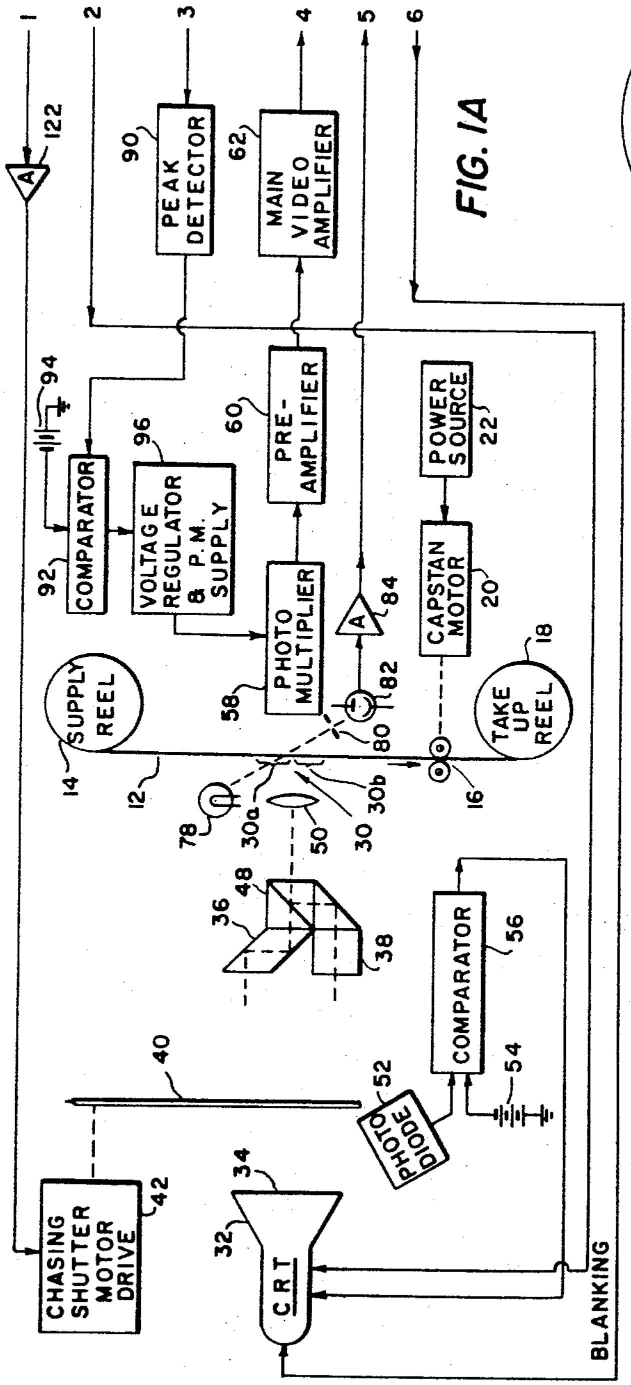
Figure 1B:
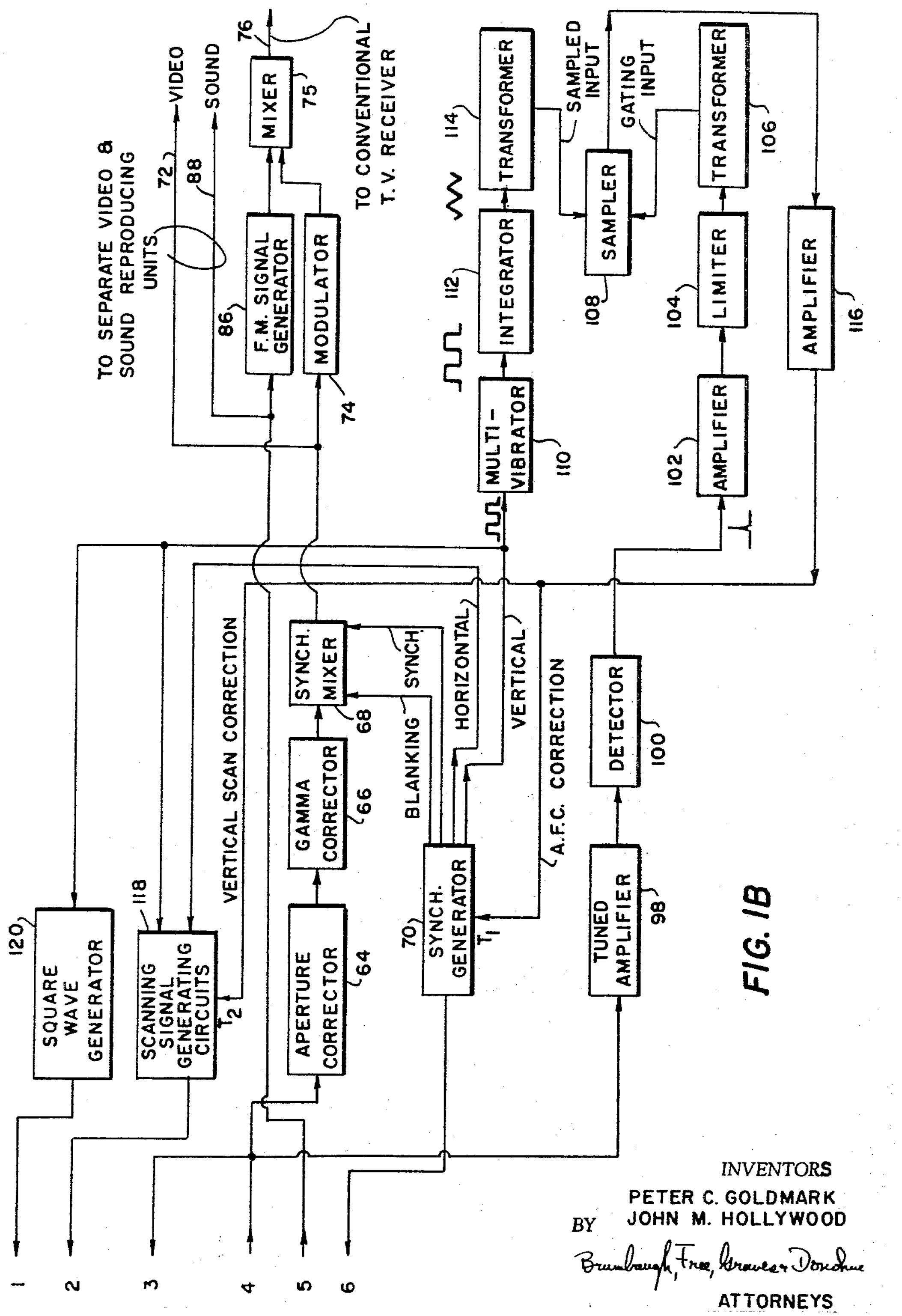

*The system of FIGS. 1A and 1B*

Referring to FIGS. 1A and 1B, a film record 12 carried on a supply reel 14 is driven continuously by a capstan arrangement 16 onto a takeup reel 18. The capstan arrangement 16 may comprise a friction drive, for example, utilizing no sprocket and therefore requiring no sprocket holes on the film which take up film space. The capstan arrangement is driven by a capstan motor 20 that is energized by an independent power source 22.

Figure 2:
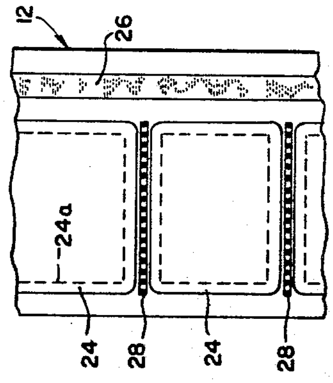
FIG. 2 is a portion of a film record, drawn to a greatly exaggerated scale, which carries information thereon that is to be reproduced.

A segment of the film record 12 is shown in FIG. 2, and comprises a series of frames 24 of picture information, i.e., a series of spaced information-bearing segments generally of uniform dimension and spacing in the direction of elongation of the film record. Also carried on the film record 12 is a sound track 26 which may be a track of variable density, for example, as shown in the figure, in which the density or light transmissivity at any point on the track is indicative of the sound information carried thereon. The track, of course, may also be of variable area, although the invention, naturally, is not limited to either one of these particular sound track arrangements. Disposed on the film record 12 is a marker portion 28 which is used to provide synchronization information. The marker portion, associated with the frames 24 of picture information and positioned, for example, between each of the frames, is shown in detail in FIG. 3.

Figure 3:
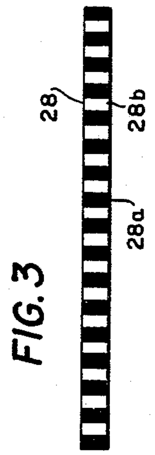
FIG. 3 is a portion of the film record of FIG. 2 illustrating the synchronization information that is recorded between adjacent picture frames.

To give an example of the film record 12 shown in FIG. 2, typically it is approximately only 249 mils or roughly ¼ inch wide and of a thickness between 1.0 and 3.5 mils. This, naturally, results in an extremely small and thin film record and in such a case a sprocket drive arrangement is typically not employed. Each picture frame 24 measures approximately 126 x 174 mils, with the portion 24a enclosed in dashed lines measuring approximately 123 x 164 mils. The portion 24a is that part of the frame 24 actually reproduced for viewing in remotely positioned television receivers. The sound track 26 is approximately 45 mils wide and the marker portion 28 measures approximately 3.5 x 173 mils. The relatively opaque markers 28a and the transparent portions 28b therebetween of FIG. 3 are approximately 5.25 mils wide.

*Film scanning apparatus*

As the film record 12 is driven by the capstan arrangement 16 from the supply reel 14 to the take-up reel 18, each of the frames 24 thereon is driven through a scanning area indicated generally by the numeral 30 in FIG. 1A. The film is scanned by a moving spot of light produced by a conventional cathode ray tube or flying spot scanner 32 which may form part of a scanning arrangement similar to that disclosed in application Ser. No. 187,025, filed Apr. 12, 1962, in the name of Dennis Gabor for "Optical Device," now U.S. Patent No. 3,198,067, and assigned to the assignee of the present application.

Figure 4:
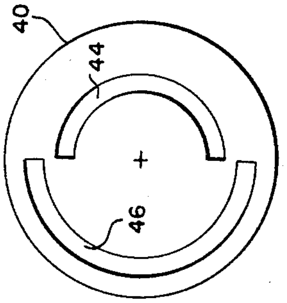
FIG. 4 is a plan view of a shutter which is used in the "film chasing" apparatus employed in the invention.

Briefly, the cathode ray tube 32 develops a spot of light which, for a film speed of 4 inches per second or 30 frames per second for the film of the dimensions given before, and in accordance with prevailing U.S. standards sweeps across face 34 of the tube in line sweep fashion generally at the rate of 60 interlaced fields per second, each field being composed of 262½ scanning lines in a raster approximately 3.250 x 1.225 inches. A pair of parallel disposed 45° prisms 36 and 38 view the face 34 of the cathode ray tube 32 through a rotating shutter 40 which is shown in detail in FIG. 4. The shutter 40, which is driven by a chasing shutter motor drive 42, is composed of an opaque material and has two slits 44 and 46 cut therein. As the shutter rotates under the action of the motor drive 42, the slits 44 and 46 alternately unmask the prisms 36 and 38, respectively, to view the face 34 of the cathode ray tube.

Each of the prisms 36 and 38, acting in conjunction with a semi-reflecting and semi-transmitting beam splitting prism 48 and a lens 50, images in reduced size the cathode ray tube face 34 on the film 12 on a different side of an axis which passes through the center of the lens 50 and which is perpendicular to the film. Specifically, when the 45° prism 36 is unmasked by the shutter slit 44, the moving spot of light on the cathode ray tube face 34 is imaged on the portion of the scanning area 30 indicated generally as 30a in FIG. 1A. Similarly, when the 45° prism 38 is unmasked by the shutter slit 46, the moving spot of light is imaged on a portion 30b of the scanning area 30.

In this fashion, as the film 12 is drawn from the supply reel 14 to the takeup reel 18 and a single frame 24 moves continuously through the scanning area 30, a first complete field of line sweeps of the moving spot of light is directed toward the area 30a, and then a second complete field of line sweeps is directed toward the area 30b. Thus, each frame 24 on the film record 12 is scanned twice with two interlaced scansions. Since the film record 12 is continuously moving, each scansion encompasses an area which is actually equal to one half of a frame 24. However, because of the movement of the film that movement and the movement of the light spot complete an effective sweep of the light spot over the entire frame.

Alternatively, the cathode ray tube 32 may form part of a scanning arrangement the same as that disclosed in the copending application Ser. No. 268,911 filed Mar. 29, 1963 in the name of Bernard Erde for "Film Scanning," and assigned to the assignee of the present application. Such an arrangement incorporates a film record in which the film frames may but need not be anamorphosed in the longitudinal direction and in which each frame on the film is scanned only once. The film is driven so that 60 frames thereon pass each second through the scanning area 30. No chasing apparatus, such as the shutter 40, drive motor 42, and prisms 36, 38, and 48, is employed.

To ensure that the light beam from the cathode ray tube 32 is of constant intensity, a control circuit comprising a photo diode 52, a source of reference potential 54 representing a standard light intensity, and a comparator 56 may be employed. If employed, the photo diode 52 views the face 34 of the cathode ray tube 32 and generates a signal representative of the intensity of the spot of light produced by the tube. This signal is applied to one input of the comparator 56 which compares the signal with the potential of the reference source 54 and generates a correction signal equal to the difference between the two.

The correction signal, representing the deviation of the intensity of the light beam from the standard intensity, is applied to a beam control grid (not shown) in the cathode ray tube 32. In this fashion, cathode ray tube light beam intensity is monitored and controlled directly, which is in distinction to the type of control heretofore previously employed in which the electrical current supplied to the tube is sampled to give an indication of light intensity. The present arrangement avoids the difficulties encountered when, due to the aging of the cathode ray tube, the light intensity drops off after a period of time for a given beam current.

*Video and sound reproducing section*

A photo multiplier 58 detects the light from the scanning light spot that is transmitted through the film record 12 and develops an electrical signal representative thereof. The signal from the photo multiplier 58 is applied to a preamplifier 60 and thence to a main video amplifier 62. The signal from the main video amplifier 62 is applied to a conventional aperture corrector 64, similar, for example, to that disclosed in U.S. Patent No. 3,011,018 granted to M. V. Sullivan, which modifies the signal to correct for aperture distortion. The signal from the aperture corrector 64 is applied to a conventional gamma corrector 66, similar, for example, to that disclosed in U.S. Patent No. 2,697,758 ganted to R. V. Little, which modifies the signal to correct for the non-linear gamma characteristic of the film record 12.

The main video signal from the gamma corrector 66 is applied to a synchronization mixer 68 which also has applied thereto a series of blanking and synchronization signals from a synchronization generator 70 which are added to the main video signal. The blanking signal added to the main video signal provides a blanking of that signal upon reproduction so that only that portion of the main video signal representative of the sweeping of the light spot through the portion 24a of the film record 12 of FIG. 2 is reproduced. The blanking signal, of course, also provides for blanking of that portion of the main video signal that occurs during horizontal and vertical retrace of the light spot, and the synchronization signal provides for synchronization during reproduction.

The signal from the synchronization mixer 68 is applied to an output lead 72 which may be coupled to remote video reproducing units (not shown). The signal is also applied to a modulator 74 which produces a modulated signal that is applied to one input of a mixer 75. A sound signal from an FM signal generator 86 is applied to the other input of the mixer 75 which produces a combined video and sound signal that is applied via a conductor 76 to remote, conventional television receivers (not shown).

The sound signal which is added to the video signal in the mixer 75 is developed as follows. As shown in FIG. 1A, a light source 78 illuminates that portion of the sound track 26 of the film record 12 that is passing through the scanning area 30. The light transmitted through the sound track 26 passes through a mask 80 to a photocell 82. The output signal from the photocell 82 is amplified in an amplifier 84 to produce a signal representative of the sound information carried on the track 26. The signal from the amplifier 84 is applied directly to a lead 88 which is coupled to remote sound reproducing units (not shown), such as conventional audioamplifiers and loudspeakers, for example, to reproduce the sound information carried on the film track 26. The signal from the amplifier 84 is also applied to the FM signal generator 86 which generates a frequency modulated signal that is added in the mixer 75 to the main video signal from the modulator 74 to produce a combined signal on the conductor 76.

The video and sound system also includes a control circuit for regulating the peak output signal from the photo multiplier 58 so that it is relatively uniform for a peak light input. This is accomplished in the following fashion. A peak detector 90 detects the peak magnitude of the signal from the main video amplifier 62 which represents the light transmitted through a transparent portion of the film record 12. The signal from the peak detector 90 is applied to a comparator 92 which compares the signal against the potential of a reference source 94 which represents a standard peak signal. Any difference between these two signals produces a correction signal from the comparator 92 which is applied to a voltage regulator and photo multiplier supply circuit 96 to change the magnitude of a biasing signal applied to the photo multiplier 58. In this fashion, peak signals from the photo multiplier are rendered fairly uniform.

*Synchronization section*

The synchronization of the raster scansions of the light spot produced by the cathode ray tube 32 to the movement of the film record 12 is accomplished as follows. First, referring to FIG. 2, it may be seen that the synchronization markers 28 are disposed between adjacent frames 24 of the film record 12. For the film dimensions, film speed, and the scanning rate of the light spot given previously, approximately 7 scanning lines are required for the light spot to sweep by the synchronization markers. As the beam sweeps by the spaced opaque and transparent portions 28a and 28b, a pulse signal is produced in the photo multiplier 58. For the dimensions given previously as to the size of the markers 28a and 28b and the scanning speed, the signal developed in the photomultiplier 58 is of a frequency approximately equal to 300 kilocycles. This frequency, of course, is completely arbitrary.

A tuned amplifier 98 (FIG. 1B) is coupled to the main video amplifier 62 and is tuned to a frequency equal to that of the signal produced by the sweeping of the light spot by the synchronization markers 28. In the example chosen, the amplifier 98 is tuned to a frequency of 300 kilocycles. The signal from the tuned amplifier 98 is applied to a detector 100 which generates a pulse signal in response thereto that is applied to an amplifier 102. The output of the amplifier 102 is limited in a limiter 104 whose output is applied to a transformer 106 used for signal "floating" purposes. The signal from the transformer 106, "floated" above ground, is applied as a gating input to a sampler 108.

Applied to the sampled input terminal of the sampler 108 is a signal of triangular waveform which is generated as follows. Vertical synchronization pulses from the synchronization generator 70, which are used to trigger the vertical sweep of the light beam in the cathode ray tube 32, are applied to a multivibrator 110. The multivibrator 110 produces a pulse signal that is applied to an integrator 112 which, in turn, develops a signal of triangular waveform as indicated in FIG. 1B. Specifically, the signal increases linearly from a base potential to a peak potential from which it decreases linearly back to the base potential. The pulses from the multivibrator 110 as integrated by the integrator 112 are chosen so that the signal of triangular waveform commences from a reference potential midway between the base and peak potentials, increasing to the peak potential and then decreasing back to the reference potential during the first one-half portion of a vertical field sweep of the spot of light from the cathode ray tube 32, and then decreasing from the reference potential to the base potential and thereafter increasing back to the reference potential during the remaining half of the field sweep.

The signal of triangular waveform is applied to a transformer 114 which is used to "float" the signal above ground and which couples the signal as a sampled input signal to the sampler 108. When the pulse from the transformer 106 gates the sampler 108, the sampler produces as an output signal that value of the sampled input signal from the transformer 114 at the instant of sampling. As may be seen, then, the sampler produces an output signal which is indicative of the time during a field sweep of the scanning light spot when the spot is sweeping by the synchronization markers 28 on the film record 12. Ideally, the light beam should sweep by the markers at the end of a field sweep and, therefore, the output signal from the sampler 108 should be equal to the reference potential of the signal of triangular waveform from the integrator 112.

The output from the sampler 108 is used as a correction signal which is applied to an amplifier 116 and thence to the synchronization generator 70 and to scanning signal generating circuits 118. As applied to the synchronization generator 70, the correction signal from the amplifier 116 constitutes an automatic frequency control correction signal which varies the frequency of the vertical pulses generated by the synchronization generator 70 that are used to initiate the field sweep of the scanning light spot. This changes the frequency of the field sweep so that it conforms and adjusts itself to the frequency at which the frames 24 of the film record 12 pass through the scanning areas **30*a* or 30*b***.

Thus, the film frames 24 pass through the scanning area 30 generally at a rate of 30 frames per second, i.e., at a rate of 60 frames per second through each of the areas **30*a* and 30*b***, and this results in a field scanning rate of 60 scansions per second.

As applied to the scanning signal generating circuits, the signal from the amplifier 116 is a vertical scan correction signal. To elaborate, the scanning signal generating circuits have applied thereto horizontal and vertical synchronization pulses which trigger the generation of sweep signals that are applied to the cathode ray tube 32 and which result in the line and field sweeps, respectively, of the scanning light spot. The vertical scan correction signal from the amplifier 116 varies the vertical field sweep signal generated by the generator 118, thereby to shift the position of the field sweep so that it encompasses a frame on the film record 12.

The time constants associated with the scanning signal generating circuits 118 and the synchronization generator 70 may be adjusted and proportioned so that the scanning signal generating circuits 118 respond more quickly to the correction signal from the amplifier 116 than does the synchronization generator 70. In this fashion, a signal from the amplifier 116 first manifests itself in a change in the field sweep location, and if this is not sufficient to provide a complete correction in the sweep, a later change in the field sweep frequency is made.

As may be noted, the synchronization generator 70 is an independently running pulse generator whose vertical pulse frequency is variable in accordance with the correction signal from the amplifier 116. Besides being applied to the scanning signal generating circuits 118, the vertical pulses are also applied to a square wave generator 120. Signals from the generator 120, in turn, are applied after amplification in an amplifier 122 to the chasing shutter motor drive 42 and supply the power to the motor. In this fashion, the shutter 40, which is used alternately to mask and unmask the 45° prisms 36 and 38, is driven in synchronism with the vertical pulse signals from the synchronization generator 70 which are also used to initiate the field sweep of the light spot in the cathode ray tube 32.

Figure 5:
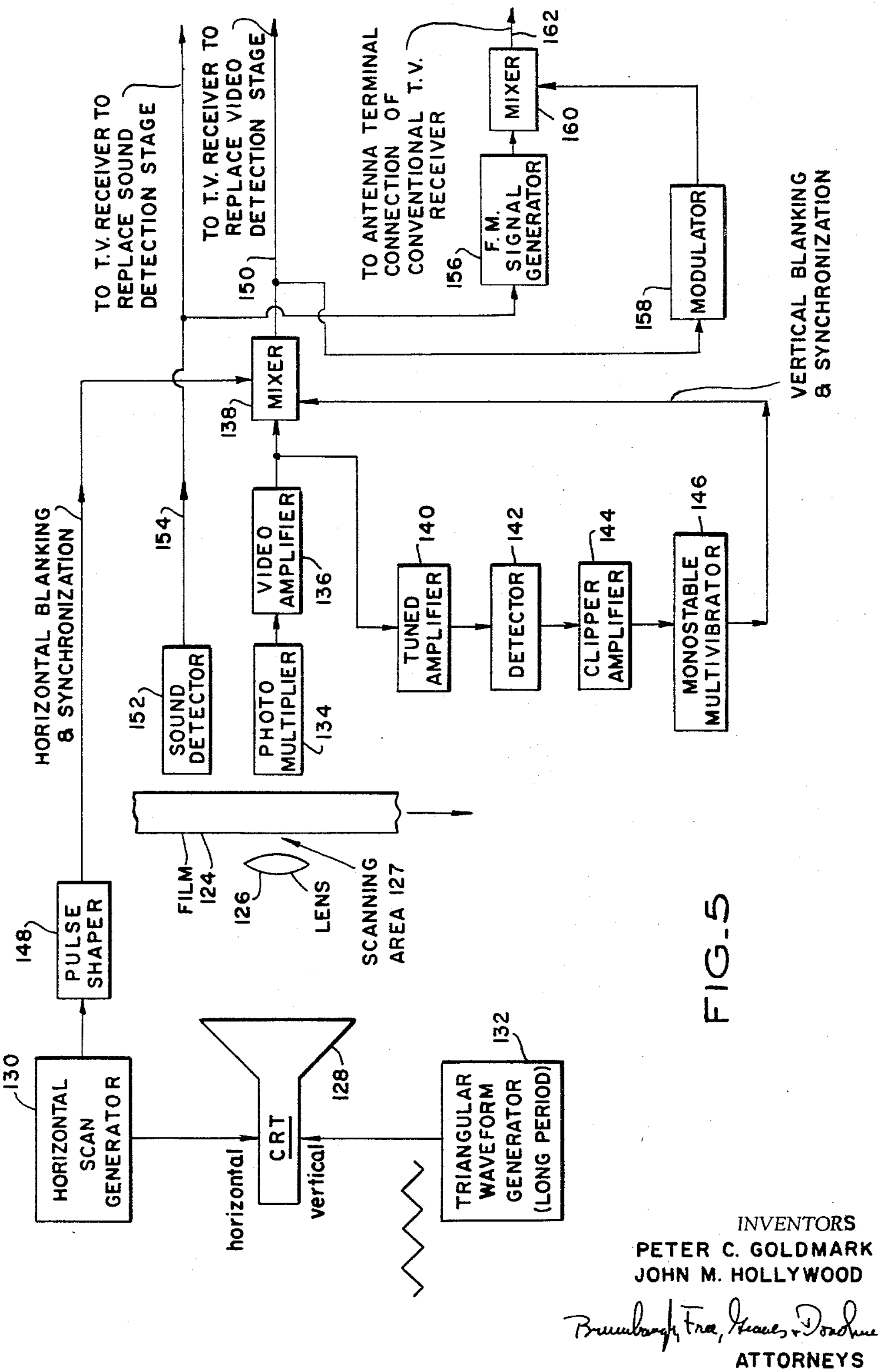
FIG. 5 is a block diagram of another film reproducing system in accordance with the invention.

*The system of FIG. 5*

FIG. 5 shows a system in accordance with the invention utilizing a line scan tube which scans a record medium in successive substantially superimposed line scans. There need be no synchronism between the film movement and film scanning in this system, inasmuch as there is no scanning field or raster present which must be synchronized with the movement of the film frames. Proper sequential reproduction of the film frames is assured by transmitting to the reproducing television sets or other monitors synchronization signals representative of the movement of the synchronizing indicia on the film record.

Turning to FIG. 5, a film record 124 is caused to move in the direction shown by the arrow by a film transport mechanism (not shown), such as the capstan arrangement 16 of FIG. 1A or a typical sprocket drive. The film record is of the type shown in FIG. 2, except that each frame is to be scanned completely only once, rather than twice as in the system of FIGS. 1A and 1B. The film transport speed is equivalent to 60 frames a second as it moves through a scanning area 127 adjacent a lens system 126 which images a spot of light from a cathode ray tube 128 upon the scanning area.

A horizontal scan generator 130, which is free running, supplies repetitive sawtooth signals to the horizontal deflection means (not shown) in the cathode ray tube 128 to cause the spot of light generated by the tube to sweep in successive superimposed lines across the scanning area 127. The line sweep frequency is 15,750 lines per second, which allocates 262.5 lines to each film frame at a film speed of 60 frames per second.

A triangular waveform generator 132 may also be employed to slowly shift the location of the successive line scans of the light spot generated by the cathode ray tube 128 to prevent the burning of the phosphor screen of the tube. The generator is coupled to the vertical deflection means (not shown) in the cathode ray tube and generates a waveform as shown in FIG. 5 adjacent the generator to slowly shift the line scans.

A photo multiplier 134 detects light from the scanning light spot that is transmitted through the film record 124 and develops an electrical signal representative of the information on the film that is scanned. This signal is applied to a video amplifier 136 which amplifies the signal and applies it to a mixer 138 and to a tuned amplifier 140. The tuned amplifier 140 may be the same as the tuned amplifier 98 of FIG. 1B, and amplifies only that portion of the signal from the video amplifier 136 representative of the scanning of the synchronizing indicia 28 (FIG. 2) on the film record by the scanning light spot. As described above with respect to the embodiment of FIGS. 1A and 1B, the scanning of the synchronizing indicia produces a signal of a particular frequency, typically 300 kilocycles. The tuned amplifier 140 of FIG. 5 is responsive to a signal of this frequency.

The signal from the tuned amplifier 140 is applied to a detector 142 which generates a signal that is applied to a clipper amplifier 144 coupled to a monostable multivibrator 146. The multivibrator 146 generates pulses which are applied to the mixer 138 to be mixed with the signal from the video amplifier 136, thereby to add pulses to the video signal used for vertical blanking and vertical synchronization in the television receivers which reproduce the information on the film record 124.

Horizontal blanking and synchronization signals are added to the video signal from the video amplifier 136 by applying pulses from a pulse shaper 148 to the mixer 138. The pulse shaper 148 receives horizontal synchronization and blanking pulses from the free running horizontal scan generator 130 and shapes these to the proper waveform for addition to the video signal.

The signal from the mixer 138 thus is representative of the picture information scanned on the film record 124, and contains synchronization and blanking information as well. This signal may be applied by a conductor 150 directly to a typical television receiver serving as a reproducing monitor to replace the signal normally generated by the video detection stage of the receiver. Sound information is supplied by a sound detector 152 which detects the sound information on the film record 124, typically in the form of a sound track such as the track 26 shown in FIG. 2. The detector 152 applies signals via a conductor 154 to the television receiver to replace the signal normally generated by the sound detection stage of the receiver. Alternatively, if a combined sound and video signal suitable for direct application to the antenna terminal connection of a conventional television receiver is desired, an FM signal generator 156, a modulator 158, and a mixer 160, the same as the components 86, 74 and 75, respectively, of FIG. 1B, may be employed to generate a combined video and sound signal on the conductor 162.

*Summary*

It will be noted that the embodiment of FIG. 5 requires no synchronization between film movement and film scanning. This is because a scanning raster is not employed, and thus synchronization information can be developed directly from the film to be used for synchronizing the scanning raster in the reproducing television receiver with the video signal. With the accuracy possible with presently employed film transport mechanisms, film speed may be maintained reasonably constant at 60 frames per second, so that the screen of the television receiver is properly filled by each film frame.

In the embodiment of FIGS. 1A and 1B, a scanning raster is employed. In this case, the scanning action must be synchronized with the moving film, and this is achieved by employing a shift in the frequency of scansions as well as in their location on a scanning area brought about by the detection of the synchronizing indicia on the film. As in the embodiment of FIG. 5, the detection of the synchronizing indicia is employed to generate synchronization signals which provide proper synchronization of the video fields with the video signal during reproduction.

It will be apparent that the embodiments of the invention described above are capable of modification. Accordingly, the invention should not be deemed limited to the embodiments specifically described, but should be taken to be defined by the following claims.

We claim:

1. Apparatus for reproducing picture information from a record medium comprising, in combination:
   - an elongated, narrow strip of thin, transparent material having formed thereon a sequence of picture information-containing frames and a sequence of synchronizing indicia associated with said frames, respectively;
   - means for transporting the strip through a scanning zone;
   - means for interrogating the frames and synchronizing indicia of the strip in a scanning zone including a scanning beam;
   - a horizontal scan signal generator productive of a periodic waveform signal at a given frequency for periodically sweeping the scanning beam across the record medium in the scanning zone in successive substantially superimposed line scans; and
   - detector means responsive to the interrogating means for developing (a) a first signal representative of the information contained in the frames of the strip and (b) a vertical synchronizing signal at a frequency related to the rate of movement of the synchronizing indicia through the scanning zone but independent of the given frequency of the periodic waveform signal.

2. Apparatus according to claim 1, further comprising:
   - means for combining the first and vertical synchronizing signals and a further signal synchronized with the periodic waveform as a composite signal suitable for application to a television receiver for reproducing the picture information contained on the record medium at the desired frame rate.

3. Apparatus in accordance with claim 2, further comprising:
   - television receiver means responsive to the composite signal from the combining means and including means for generating a time sequence of visible television fields representing the sequence of frames on the strip, and means responsive to the vertical synchronizing signal and the initiation of the respective fields for controlling initiation of the field so as to maintain them in synchronism with the movement of the frames through the scanning zone.

4. Apparatus as set forth in claim 1, further comprising:
   - means for imparting a periodic longitudinal shift to the location of the line scans at the interrogating means at a movement rate substantially less than the rate at which the strip is transported through the scanning zone.

5. Apparatus as set forth in claim 1, in which:
   - the synchronizing indicia on the strip are arranged to produce, when scanned by the interrogating means, a periodically varying waveform; and
   - the detector means includes frequency selective means distinctly responsive to the periodically varying waveform for separating such waveform from the first signal.

6. Apparatus in accordance with claim 5, in which:
   - the detector means further includes waveform generator means connected to receive the output of the frequency selective means for developing the vertical synchronizing signal in the form of at least one distinct pulse during each occurrence of the periodically varying waveform.

7. Apparatus as defined in claim 1, in which:
   - the synchronizing indicia are disposed on the strip between adjacent ones of the frames.

8. Apparatus according to claim 7, in which:
   - the strip includes sound information disposed in a sound track extending longitudinally of the strip adjacent the frames.

9. Apparatus as set forth in claim 7, in which:
   - the synchronizing indicia disposed between adjacent pairs of frames comprise a series of spaced opaque areas on the strip.

10. Apparatus as set forth in claim 1, in which:
    - the synchronizing indicia comprises a plurality of record elements of alternately opposite character having a uniform spacial distribution on the record strip.

11. Apparatus according to claim 10, in which:
    - the record elements extend transversely across the strip.

12. Apparatus according to claim 10, in which:
    - the strip has a thickness of no greater than about 3.5 mils and the picture information and record elements comprise regions of varying light transmission characteristics.

(References on following page)

References Cited

UNITED STATES PATENTS

| | | | |
|---|---|---|---|
| 2,769,028 | 10/1956 | Webb | 178—7.2 |
| 2,804,550 | 8/1957 | Artzt | 178—7.2 |
| 2,818,466 | 12/1957 | Larson | 178—7.2 |
| 2,947,810 | 8/1960 | Horsley | 178—6.7 |
| 3,189,683 | 6/1965 | Mullin | 178—6.7 |
| 3,234,326 | 2/1966 | Goldmark | 178—6.7 |

JOHN W. CALDWELL, *Acting Primary Examiner.*

H. W. BRITTON, *Assistant Examiner.*